United States Patent
Rupert et al.

[11] Patent Number: 5,838,218
[45] Date of Patent: Nov. 17, 1998

[54] WAVEGUIDE SWITCH

[75] Inventors: Lawrence T. Rupert; William F. Swisher, both of Carthage, Ill.; Theodore P. Kill, Troy, Mich.

[73] Assignee: Methode Electronics, Inc., Chicago, Ill.

[21] Appl. No.: 758,162

[22] Filed: Nov. 25, 1996

[51] Int. Cl.⁶ .................................................. H01H 53/00
[52] U.S. Cl. .................................. 335/4; 385/50; 340/555
[58] Field of Search ...................... 335/4.5; 340/545–555; 73/290 R; 385/41, 15–17, 21, 22, 8–11, 47, 50; 356/73.1

[56] References Cited

U.S. PATENT DOCUMENTS 3,909,108  9/1975  Taylor ................................. 350/96 WG
5,629,681  5/1997  DuVall et al. ............................ 340/665
5,699,465  12/1997  Nakaya ..................................... 385/41

*Primary Examiner*—Lincoln Donovan
*Attorney, Agent, or Firm*—David L. Newman, Esq.

[57] ABSTRACT

A waveguide switch is provided in which energy such as ultrasonic optical, electromagnetic or infrared waves travel in a first waveguide having fixed length formed in a first member connected to a second member having multiple waveguides of varying lengths which may be rotatably mounted to the first waveguide in order that upon rotation of the first or second member, different waveguides may be aligned to form an overall position identifying waveguide of varying lengths in order to provide a means for controlling a component attached to the switch. A transmitter and a receiver are mounted within the waveguide and connected to a detector in order to convert the time-of-flight data of the waves to an electrical signal.

9 Claims, 5 Drawing Sheets

WAVEGUIDE SWITCH

BACKGROUND OF THE INVENTION

The present invention relates to a waveguide switch and a means of varying the length of a waveguide in order to identify discrete positions of the switch.

Switches employing contacts formed from electrically conductive materials, usually metal, are commonly known in which one or more sets of contacts connect to close one or a combination of electrical circuits which correspond to the selected switch position. These devices have been in use for at least one hundred years and are well known to those skilled in the art. The reliability of these devices is limited by the use of electro-mechanical switch contacts which degrade with usage and are susceptible to failure due to contamination. Further, the tactile response (force v. displacement) characteristics of these devices is often adversely affected by the friction and momentum of the switch contacts.

Waveguide switches are used, for example, at gas stations where the change in air pressure within a tube is detected in order to ring a bell. Also known are tape switches which are used in steering wheels which require a perpendicular force to be acted on the conductors of the tape switch. These switches are limited in their use due to their restrictive requirements for being oriented specifically to the input force and their inability to be bent around objects. While these switches may use time-of-flight measurements in order to measure a change along the waveguide, such switches cannot replace most switches used in household and business machines and automobiles.

Therefore, it is an object of the present invention to provide a non-contact switch having a means for detecting the change in the orientation of the switch.

It is another object of the present invention to provide a switch which will not degrade with usage and is not susceptible to failure due to contamination.

It is a further object of the present invention to provide a waveguide switch which does not require a specific orientation to the input force to activate the switch.

It is also an object of the present invention to provide for a switch incorporating a waveguide for measuring time-of-flight changes in the waveguide using ultrasonic, optical, or electromagnetic waves or pulses as an energy source.

It is a further object of the present invention to provide a switch having a waveguide for identifying a discrete position of the switch by changing the length of the waveguide.

SUMMARY OF THE INVENTION

A waveguide switch providing a waveguide for identifying a discrete position of the switch is provided that comprises a first waveguide having a uniform length formed in a first member of the switch, a second waveguide having a variable length formed in a second member of the switch, the first and second waveguides being aligned to form an enlarged waveguide, a transmitter mounted at a first end of the enlarged waveguide, a receiver mounted at the first end of the enlarged waveguide and a detector connected to the transmitter and receiver for detecting the amount of change in the length of the enlarged waveguide. The first and second waveguides may be oriented parallel to an axis of rotation of the switch. The second member may be rotated in order to align the second waveguide to the first waveguide. The first and second waveguides may be both oriented perpendicular to an axis of rotation of the switch. The first member may be rotated to align the first waveguide to the second waveguide. The second member may include multiple waveguides having varying lengths. The first member may include multiple waveguides having variable lengths. The first member of the switch may include a stalk for a multi-function switch of an automobile. The first member of the switch may comprise a cylindrical-shaped member having at least two positions. The switch may have the transmitter and receiver mounted at an end of the first waveguide. The switch may have a detector mounted at one end of the first waveguide. The switch may have a transceiver mounted at a first end of the position identifying waveguide. The transceiver may use ultrasonic, infrared, optical or electromagnetic energy.

These and other features of the invention are set forth below in the following detailed description of the presently preferred embodiments.

DETAILED DESCRIPTION OF THE PRESENTLY PREFERRED EMBODIMENTS

Figure 1:
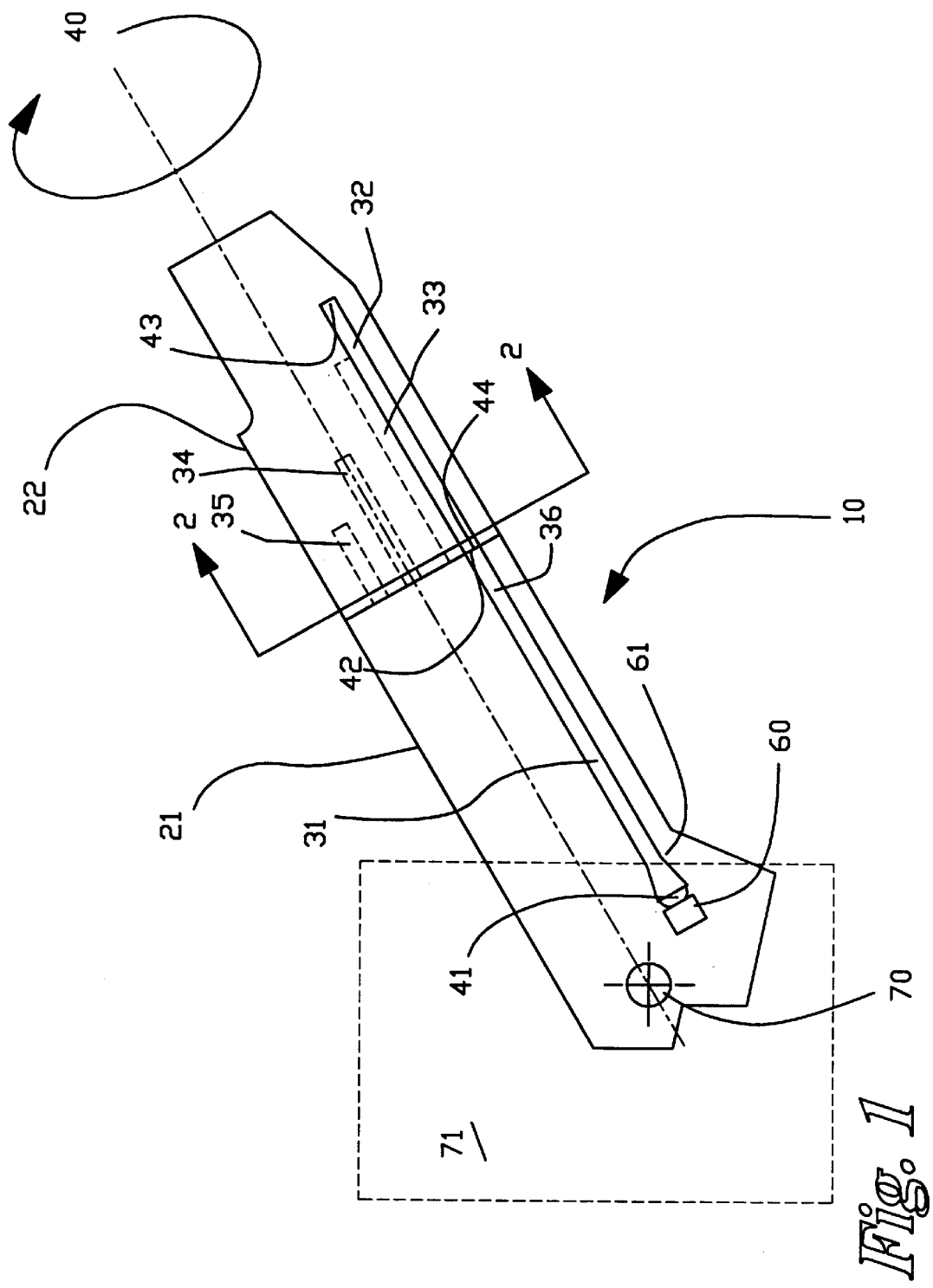
FIG. 1 is a side cut-away view of a first embodiment of a switch using the present invention.
Figure 2:
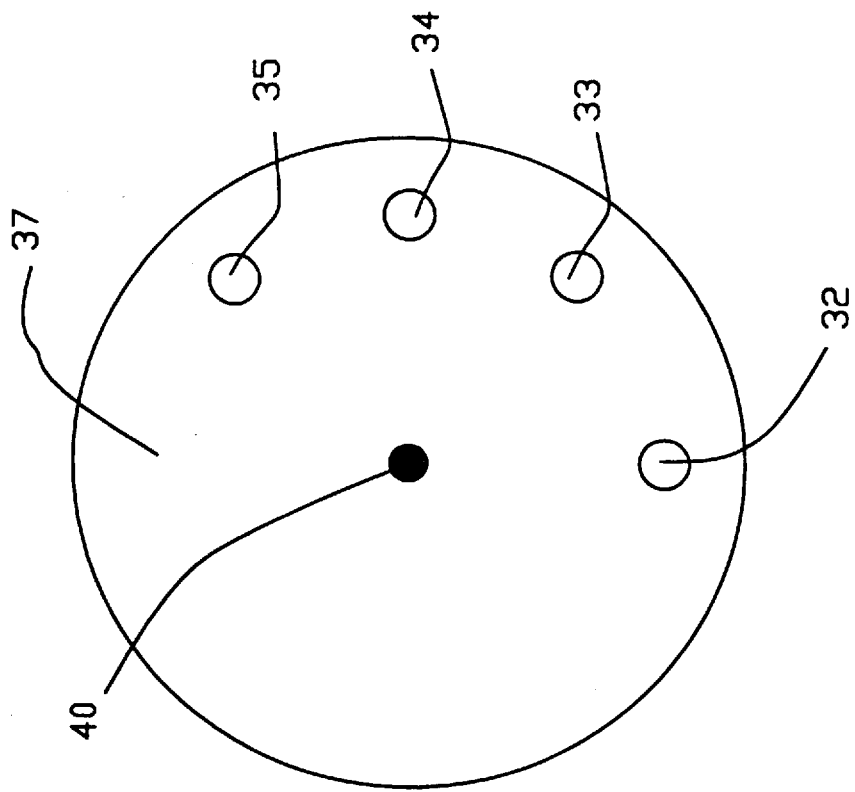
FIG. 2 is a cut-away view of FIG. 1, taken at line 2—2.

FIGS. 1 and 2 depict a first embodiment of a rotary switch which, in a preferred embodiment, may be used as a multi-function switch of an automobile for controlling, for example, wiper speed or to turn on and off headlights and, also, provide turn signals. The switch 10 includes a first member 21 having a first waveguide 31 formed therein and a second member 22 including a second waveguide 32. The second member 22 is a cylindrical member mounted at the end of the first member 21 which is also cylindrical and has a diameter approximately equal to the diameter of the second member 22. The second member 22 may rotate along an axis of rotation 40. The second member 22 is shown in a position in FIG. 1 wherein the first waveguide 31 is aligned with the second waveguide 32 in order to form an enlarged waveguide 36 for identifying a discrete position of the switch. Also located within the second member 22 are third waveguide 33, fourth waveguide 34 and fifth waveguide 35. The second, third, fourth and fifth waveguides 32,33,34 and 35, respectively, all have different lengths so that upon alignment with the first waveguide 31 a change in the wave pattern occurs within the enlarged waveguide 36. The first waveguide 31 includes a closed end 41 and an open end 42. The second waveguide 32 includes a closed end 43 and an open end 44. The enlarged waveguide 36 is formed when the open end 42 of the first waveguide is aligned with the open end 44 of the second waveguide 32. As the second member 22 is rotated along the rotation of axis 40, the other waveguides 33,34 and 35 may also be aligned with the first waveguide 31 when the open ends are aligned in order to form other enlarged waveguides having varying lengths.

Mounted at the closed end 41 of the first waveguide 31, in a preferred embodiment, is a transducer 60. In the preferred embodiment, the transducer 60 will include both a transmitter and a receiver and the transducer is electrically connected to a detector. In an embodiment, ultrasonic waves may be transmitted, received and detected by the transducer 60. However, the present invention functions identically when the transducer uses other types of wave energy such as optical, electromagnetic or infrared.

The functioning of the switch 10 will be explained by discussing how a preferred embodiment of the invention providing a multi-function switch for an automobile operates. However, the function of the present invention will be similar for other embodiments providing switching for other purposes. The first member 21 is injection molded of a polymer material forming the first waveguide 31. The first waveguide 31 is an elongated cylindrical cavity molded within the first member 21 having the transducer 60 mounted at the closed end 41. The first member 21 is pivotally mounted at the mounting point 70 to a steering wheel shaft assembly 71. The entire switch 10 may be moved up or down on the mounting point 70 in order to control the turn signals of the automobile. The second member 22 is a molded cylindrical member having an approximately equal diameter to the first member 21. The second member 22 is attached to the first member 21 at the axis of rotation 40 (see FIG. 2) and the second, third, fourth and fifth waveguides 32,33,34 and 35 are molded within the second member having different lengths but located the same distance from the axis of rotation 40. The switch 10 includes all of the waveguides 31,32,33,34 and 35 being oriented parallel to the axis of rotation 40. This orientation allows for a stalk-type switch having a relatively small diameter and the waveguides run along the length of the axis of the switch 10. In an embodiment, the discrete positions of the second member 22 may provide for controlling the speed of windshield wipers. The four waveguides 32,33,34 and 35, in addition to a dummy position 37 may provide five speed controls for the windshield wipers. In the position shown in FIG. 1, where first waveguide 32 is aligned with second waveguide 32 to form an enlarged waveguide 36, the transducer 60 will transmit ultrasonic waves at between 20–500 kilohertz. A horn-shaped or tapered portion 61 at the closed end 41 of the waveguide 31 may be used to guide the ultrasonic waves into and out of the waveguide 31 in order to cause a minimum of reflection of the waves back to the transmitter 60 and allow for the optimum expansion of the waves for being received by the transducer 60.

In the preferred embodiment, the transducer 60 is used to transmit and receive the waves. Such an arrangement is possible dependent on the ratio of the inductance to the resistance (Q), the frequency transmitted and the length of the waveguide. For example, if the Q is low, the frequency is high and the minimum distance to be measured is at least 3 cm., a single transducer 60 may be used for both transmitting and receiving. The transducer 60 operates by determining the time between transmitting and receiving a wave by measuring the distance to the point where the waves are reflected. Where the second member 22 of the switch 10 is in its first position having the second waveguide 32 aligned with the first waveguide 31, a wave travels the furthest to reach the end 43 of the enlarged waveguide 36. As the second member 22 is rotated into the alternate positions, the distance that the waves travel to reach the end of the third, fourth or fifth waveguide decreases, providing a different time-of-flight measurement by the transducer 60. The transducer is connected to a detector which transforms the wave signals to electrical signals in order to operate the systems connected to the switch 20, for example, the windshield wipers. The detector also operates to generate the required pulse train which is input to an amplifier, to amplify the pulse train such that, when input to a transmitter, the pulse train signal can effect the desired transmitter output, to condition and discriminate the input signal from the receiver, to time the receipt of the input signal against the point in time in which it was transmitted, to correlate the time-of-flight to a predetermined mechanical switch state and to apply that correlation to an appropriate output interface. At each position of alignment between the first waveguide 31 and the variably lengthened waveguides 32, 33, 34 and 35 and the dummy position 37, the total waveguide length of the enlarged waveguide 36 corresponds to the length of the first waveguide 31 plus the length of the waveguide of the second member 22 aligned to the first waveguide 31. The above description was provided for the switch operating to control the speeds of windshield wipers. However, the switch of the present invention may be used for many other functions including determining the intermittency of a windshield wiper system, or controlling turn signals, headlights, radio heating and air conditioning functions in an automobile. Other non-automotive functions for the switch 80 may also be provided.

Figure 3:
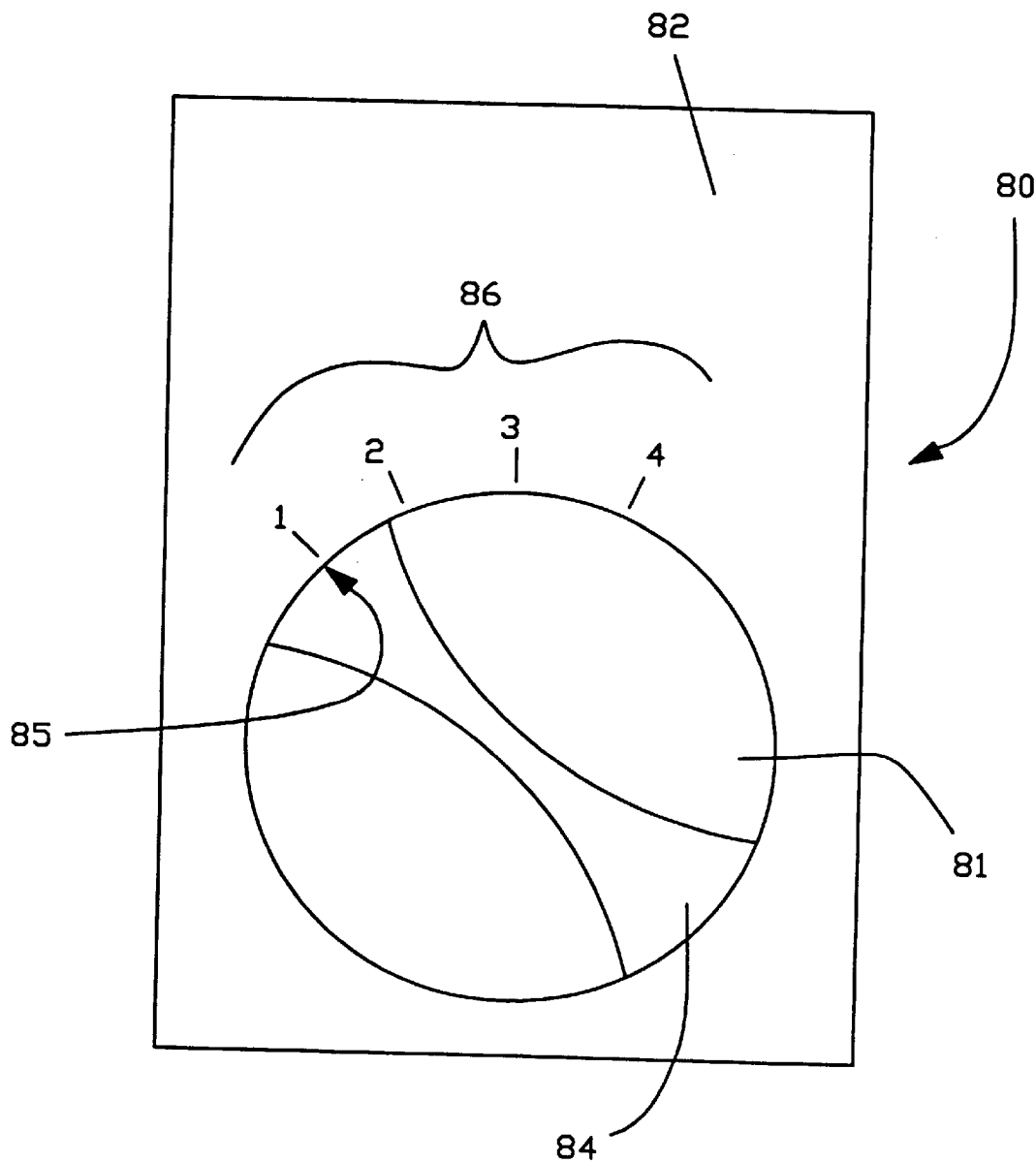
FIG. 3 is a plan view of another embodiment incorporating the present invention.
Figure 4:
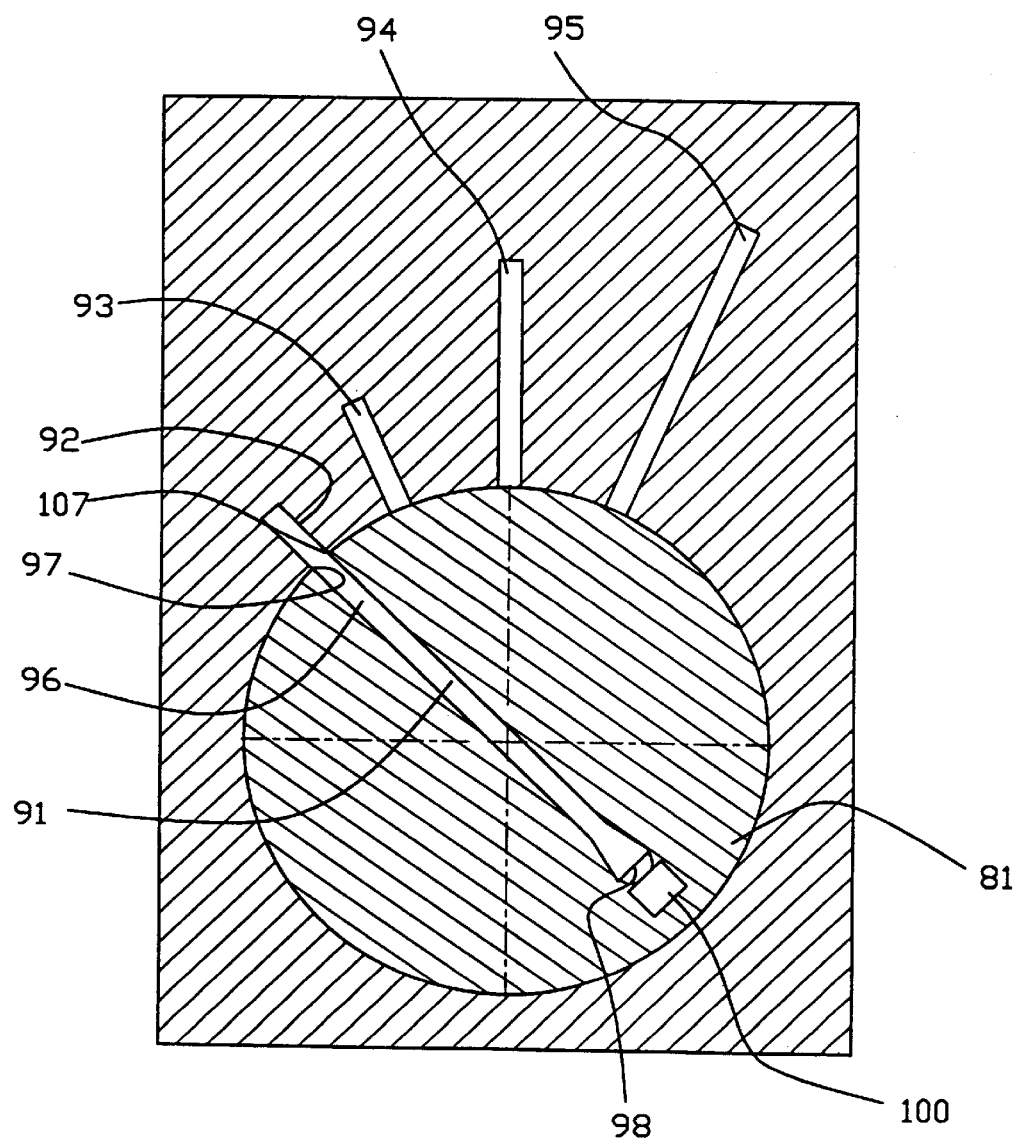
FIG. 4 is a cut-away view of FIG. 3 showing the waveguides of the present invention.

Turning to FIGS. 3 and 4, another embodiment of the present invention is disclosed. FIG. 3 shows a first member 81 mounted to a second member 82 of the switch 80. The first member 81 is a cylindrical-shaped knob preferably molded of a polymer material having a protruding gripping portion 84. The first member 81 includes a position indicating identifier 85 such as a printed white arrow on the surface of the dial 81. The second member 82 also includes individual position identifiers 86 in order to identify the position of the first member 81. In an embodiment, the switch 80 may be used to control the speeds of a fan for an air conditioner or heater.

Turning to FIG. 4 a cross-section of FIG. 3 is shown having first member 81 having a first waveguide 91 having a fixed length having a closed end 98 having a transducer 100 mounted at the closed end 98 and an open end 97. The second member 82 has molded therein a second waveguide, a third waveguide, a fourth waveguide and a fifth waveguide 92,93,94 and 95 respectively. The first waveguide 91 is shown aligned with the second waveguide 92 so that the open end 97 of the first waveguide 91 aligns with the open end 107 of the second waveguide 92. The axis of rotation of the first member 81 is perpendicular to the orientation of the waveguides 91,92,93,94 and 95. When the first member 81 is rotated so that the first waveguide 91 is aligned with the second waveguide 92 (the position identified as "1" in FIG. 3) an enlarged waveguide 96 is formed providing for a total length which identifies the location of the first member 81 in a first position. The transducer 100 is connected to a detector means which corresponds the total length of the enlarged waveguide 96 to a specific function. For example, a low speed of a fan. As discussed above, the time-of-flight measurement will change as the first member 81 is rotated so that the first waveguide 91 aligns with the successively larger waveguides 93,94 and 95.

The transducer 100, in a preferred embodiment, includes a transmitter, a receiver and is connected to a detector. The transducer 100 will be connected via electrical wires through the first member 80 and the second member 82 to the detector in order to operate an external system. As discussed above, the transducer 100 may be located at the closed end 98 of the first transducer or, in an alternate embodiment, the transducer may be located at the closed end of the second, third, fourth or fifth waveguides. However, the preferred embodiment shown in FIG. 4 having the transducer 100 located at the closed end 98 of the first waveguide 91 allows for only a single transducer to be used for the entire switch 80. Whereas by placing the transducer at the closed end of the second, third, fourth and fifth waveguides would require five transducers and increase the cost of the switch. In the preferred embodiment, as shown in FIG. 4, the transmitter and receiver are combined as a transceiver located with the transducer 100 in order to reduce cost. It is noted that all of the waveguides shown in FIGS. 1–4 are straight and do not have any curvatures. However, the present invention may also operate having curved or nonlinear waveguides. In an embodiment such as the switch of FIGS. 3 and 4, it is possible that severe space constraints may require that the second, third, fourth and fifth waveguides be curved in order to fit in a smaller space. Thus, the differing lengths of the waveguides still may be achieved within a smaller circumference around the first member 81.

Figure 5:
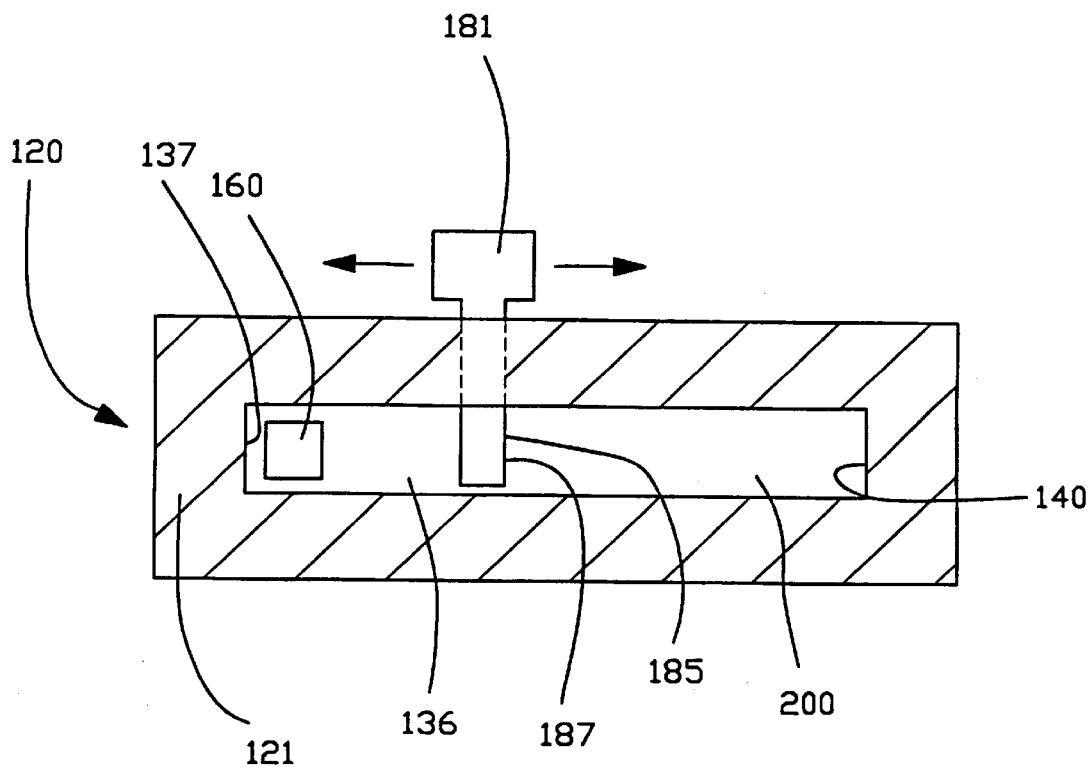
FIG. 5 is a cut-away view of an alternate embodiment of the present invention.

Turning to FIG. 5, a further alternate embodiment of the present invention is shown showing waveguide switch 120 having a single waveguide 136 molded within the switch housing 121. Mounted to the housing 121 is a switch member 181 which is slidingly mounted to the housing 121 in order to move axially along the direction of the waveguide 136. The switch member 181 includes a gate 185 that protrudes into the waveguide 136. The gate 185 includes an orifice 187. Mounted at the first end 137 of the waveguide 136 is a transducer 160. The switch member 181 is slidingly movable from a first position as shown in FIG. 5 to a second position 200. Upon movement of the switch member 181 from the first position to the second position, the time-of-flight measurements of the energy waves being transmitted from the transducer 160 will vary. The transducer is connected to a detector which can detect both the change in the length of the waveguide varied by sliding the switch member 181 from a first position to a second position and also the rate of the change of the switch member 181 from the first position to the second position. In addition, the energy waves will reflect off of the gate 185 and also pass through the orifice 187 and reflect off of a second end 140 of the waveguide. Thus, the switch will establish multiple return echoes by some of the wave energy reflecting off of the gate 185 and other portions of the wave energy reflecting off of the second end 140 of the waveguide 136. A detector connected to the transducer 160 can measure the multiple wave echoes and measure the change in the position of the gate 185 of the switch member 181, the rate of change of the position of the gate 185 and to measure a constant state of the waveguide in order to detect any defects in the system. The orifice 187 allows detection of multiple switch positions. It also facilitates self-diagnostics, i.e., monitoring of time-of-flight for the longest possible waveguide length would enable detection of electronic or transducer failure because that time-of-flight is a constant.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A waveguide switch comprising:

a first waveguide having a uniform length formed in a first member of the switch;

a plurality of second waveguides of varied lengths formed in a second member of the switch, wherein the first and second member pivotally mount to one another and combine thereto to align the first waveguide and one of the second waveguides into an enlarged waveguide;

a transmitter mounted at a first end of the enlarged waveguide;

a receiver mounted at said first end of the enlarged waveguide; and a detector connected to the transmitter and receiver for detecting the amount of change in the length of the enlarged waveguide.

2. The waveguide switch of claim 1 wherein the first waveguide, and the second waveguides are both oriented parallel to an axis of rotation of the first and second member relative to one another.

3. The waveguide switch of claim 1 wherein the first waveguide, and the second waveguides are both oriented perpendicular to an axis of rotation of the first and second member relative to one another.

4. The waveguides switch of claim 2 wherein the switch provides a multi-function switch for an automobile wherein the first member is a molded plastic cylindrical stalk having a diameter and the first waveguide molded within the first member and the second member being a cylindrical member being approximately equal to the diameter of the first member and mounted at an end of the first member so that the second member may rotate in order to align one of the second waveguides formed within the second member to the first waveguide.

5. The waveguides switch of claim 4 wherein the switch is pivotally mounted to a housing in order to provide additional control mechanisms for the switch.

6. The waveguide switch of claim 1 wherein the enlarged waveguide is formed to a cavity having rigid nonbendable walls.

7. The waveguide switch of claim 2 wherein the first member is a cylindrical shaped disk having the first waveguide running approximately through a radius of the disk perpendicular to the axis of rotation of the first member.

8. A waveguide switch comprising:

a housing;

a waveguide molded in the housing;

a switch member slideably mounted within the waveguide to be moveable between a plurality of discrete positions; and a detector connected to the waveguide for detecting a change in the position of the switch member.

9. The waveguide of claim 8 wherein the detector detects a change in the rate at which the switch member is moved from the first position to the second position.

* * * * *